US010425704B2

(12) United States Patent
Torpy et al.

(10) Patent No.: US 10,425,704 B2
(45) Date of Patent: Sep. 24, 2019

(54) RADIO AND ADVANCED METERING DEVICE (71) Applicant: Landis+Gyr Innovations, Inc., Alpharetta, GA (US)

(72) Inventors: Keith Torpy, South Sydney Business Hub NSW (AU); Justin Clifford Matthews, Arncliffe (AU); Paul Collins, South Sydney Business Hub NSW (AU); Chris Calvert, Roswell, GA (US); Matt Karlgaard, Nisswa, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/035,730

(22) Filed: Jul. 16, 2018

(65) Prior Publication Data

US 2019/0124424 A1 Apr. 25, 2019

Related U.S. Application Data (60) Provisional application No. 62/576,380, filed on Oct. 24, 2017.

(51) Int. Cl.
*H04Q 9/00* (2006.01)
*G01D 4/00* (2006.01)
(52) U.S. Cl.
CPC .............. *H04Q 9/00* (2013.01); *G01D 4/008* (2013.01); *H04Q 2209/40* (2013.01); *H04Q 2209/60* (2013.01)

(58) Field of Classification Search
None
See application file for complete search history.

(56) References Cited

U.S. PATENT DOCUMENTS

| 2001/0038343 | A1 | 11/2001 | Meyer et al. | |
|---|---|---|---|---|
| 2004/0246143 | A1 | 12/2004 | Crichlow | |
| 2006/0012491 | A1* | 1/2006 | Mahowald | H04Q 9/00 340/870.02 |
| 2013/0110837 | A1* | 5/2013 | Dai | H04Q 9/00 707/737 |
| 2013/0297242 | A1* | 11/2013 | Bartmess | G01R 21/133 702/61 |
| 2014/0327553 | A1 | 11/2014 | Whitaker et al. | |
| 2015/0345986 | A1* | 12/2015 | Yamamoto | H04Q 9/00 340/870.02 |

(Continued)

OTHER PUBLICATIONS

Draft Standard for Utility Industry End Device Communications Module, P1704/D15, IEEE, Aug. 2017, 36 pages.

(Continued)

*Primary Examiner* — Thomas S McCormack
(74) *Attorney, Agent, or Firm* — Kilpatrick Townsend & Stockton LLP (57) ABSTRACT

A radio and advanced metering system. In an example, a multi-device module includes a host device interface configured to connect to a host device. The host device interface includes a communications interface that can send communications to and receive communications from the host device. The multi-device module includes a radio that can to connect to a wireless network and a microcontroller configurable to provide metering functions and smart metering applications.

20 Claims, 6 Drawing Sheets (56) References Cited

U.S. PATENT DOCUMENTS

2016/0164725 A1* 6/2016 Wu ..................... H04W 76/10
                                                                713/168
2016/0370204 A1* 12/2016 Spanier ................. G01D 4/002

OTHER PUBLICATIONS

Electromechanical Specification for Modular Electric Meters, Draft American National Standard, ANSI C12.XX-2000-Revision .01a, Oct. 1999, 16 pages.
TPC New Type Modularization AMI Meter—Specification of AMI Residential Meter, Fortune Electric, 2017, 37 pages.
International Patent Application No. PCT/US2018/056993, "International Search Report and Written Opinion", dated Feb. 4, 2019, 12 pages.

* cited by examiner

RADIO AND ADVANCED METERING DEVICE

RELATED APPLICATION

This application claims the benefit of U.S. Provisional Application No. 62/576,380, filed Oct. 24, 2017, which is incorporated by reference in its entirety.

TECHNICAL FIELD

This invention relates generally to metering systems and more specifically to a module that provides radio and advanced processing capabilities to a host device.

BACKGROUND

Metering devices are deployed at businesses, homes, and other premises for measuring consumption of resources, such as electricity, water, and gas. Some metering devices provide only basic metering functions, whereas other metering devices provide advanced metering functions, as well as communications functions.

It may be desirable to provide advanced metering and communications functions to a metering device that provides only basic metering functions. One option is to redesign the meter to provide the additional functions. However, this option may require extensive design and testing, which may be costly and time consuming. Hence, other solutions are needed for easily upgrading a basic metering system with advanced functionality.

SUMMARY

Certain aspects and features include an advanced metering system. In an example, a multi-device module includes a host device interface configured to connect to a host device. The host device interface includes a communications interface configured to send communications to and receive communications from the host device. The host device interface also includes a power interface configured to provide power to the multi-device module. The host device interface further includes an antenna interface configured to connect a radio on the multi-device module with an antenna on the host device. The radio is configurable to transmit radio frequency signals to a wireless network via the antenna interface. The radio is further configurable to receive radio frequency signals from the wireless network via the antenna interface. The advanced metering system also includes a computing device communicatively coupled to the communications interface and to the radio. The computing device may provide advanced metering functions. In one example, the computing device is configurable to provide interval data functions by receiving resource consumption information from a metering device on the host device via the communications interface. The computing device is further configurable to process the resource consumption information to generate interval data, wherein the interval data indicates consumption over at least one interval period. The computing device is further configurable to store the interval data in memory on the multi-device module, generate an interval data message that includes at least a portion of the interval data, and cause the radio to send the interval data message via the wireless network to a central system.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Aspects of the present invention relate to an integrated radio and advanced metering device. In an example, a radio and advanced metering device includes a wireless transceiver or radio and a computing device. The radio can perform communications functions such as joining a wireless mesh network or other network. The computing device can receive basic information such as resource consumption from a host device and use the information to provide advanced functions such as smart metering or home automation.

A radio and advanced metering device can be added to a host device, such as a low cost meter, to provide additional capabilities. The radio and advanced metering device can be a self-contained, plug-and-play module with a small form factor and a relatively low cost. Advantages of the radio and metering device include its quick and easy installation in a host device to provide enhanced functions without the need to design and test a new meter. Its small size allows the device to be installed in host devices with small form factors.

Figure 1:
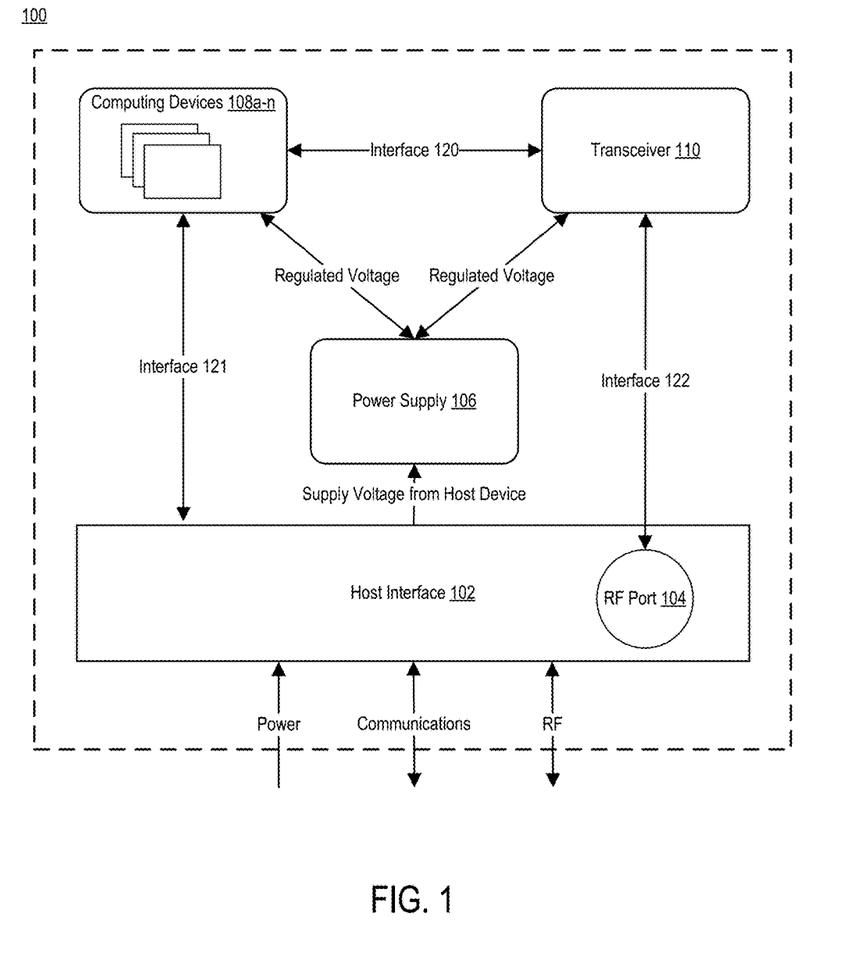
FIG. 1 is a block diagram illustrating an exemplary radio and advanced metering device.

FIG. 1 is a block diagram illustrating an exemplary radio and advanced metering device. Radio and advanced metering device 100 includes host device interface 102, one or more computing devices 108*a-n*, transceiver 110, and power supply 106. Radio and advanced metering device 100 can connect, via the host device interface 102, to a host device such as a meter, and provide additional functionality to the host device. Radio and advanced metering device 100 includes various interfaces, such as interface 120 that connects computing devices 108*a-n* with transceiver 110, interface 121 that connects computing device 108*a-n* with the host device interface 102, and interface 122 that connects transceiver 110 with the RF (Radio Frequency) port 104. Although the interfaces are shown in FIG. 1 as separate interfaces, other configurations are possible.

Host device interface 102 facilitates a connection between the radio and advanced metering device 100 and the host device. As shown in FIG. 1, the host device interface 102 can provide multiple connections to the host device. Computing devices 108*a-n* may receive communications from the host device and in some instances may also send communications to the host device using a communications interface of the host device interface 102. Host device interface 102 can support protocols such as universal serial bus (USB), universal asynchronous receiver-transmitter (UART), serial connection, or other protocols for communications between the host device and the radio and advanced metering device. Host device interface 102 can include analog connections such as raw meter outputs, digital connections such as digital pulses generated from metering devices, or other signals. Connection via a USB connection allows the host device interface 102 to receive power and signaling. Host device interface 102, via the communications interface can receive communications from a host device that is configured to communicate with a head-end system via power-line communications, i.e., communications that are transmitted over a power delivery line.

Radio and advanced metering device 100 can have one or more computing devices 108a-n. Code space for one or more applications may reside on one device and additional code space may reside on another device. A communications stack may reside on the same device as the code space for an application or a different device. Exemplary advanced metering applications may provide interval data, tariffication, event logging, load control, QOS (quality of service), outage detection, load disaggregation, load forecasting, usage analytics, distributed energy resource management, load switch management, appliance fault detection, and thermostat control. Other types of applications are also supported that provide enhanced functions, including wireless communications, to a host device.

Host device interface 102 can also provide RF port 104 or antenna interface, which can connect to an antenna or Radio Frequency subsystem, e.g., an amplifier, etc. located on the host device. RF port 104 enables transceiver 110 to send or receive communications, e.g., via an external antenna such as antenna 308 depicted in FIG. 3.

Computing devices 108a-n can communicate with devices that are external to the radio and advanced metering device via transceiver 110. Transceiver 110 may support any type of communications protocol including, but not limited to a wireless standard, such as IEEE 802.15.4, a proprietary wireless protocol, or a cellular standard. Transceiver 110 implements communications functions. Example communications functions are encoding, decoding, encryption, or decryption of digital messages, and multiplexing or demultiplexing of signals, e.g., TDMA, CDMA, or FDMA. Other example functions are the modulation or demodulation of signals on to carrier signals.

Power supply 106 can receive power from the host device via host device interface 102 The host device may be powered by a battery or by another power source. When the host device is an electric meter, it may be a mains powered device. Power supply 106 can provide regulated power to other components (e.g., computing devices 108a-n, or transceiver 110). In this manner, the host device interface 102 allows power from the host device to power the components of the radio and advanced metering device via a power interface of the host device interface.

Figure 2:
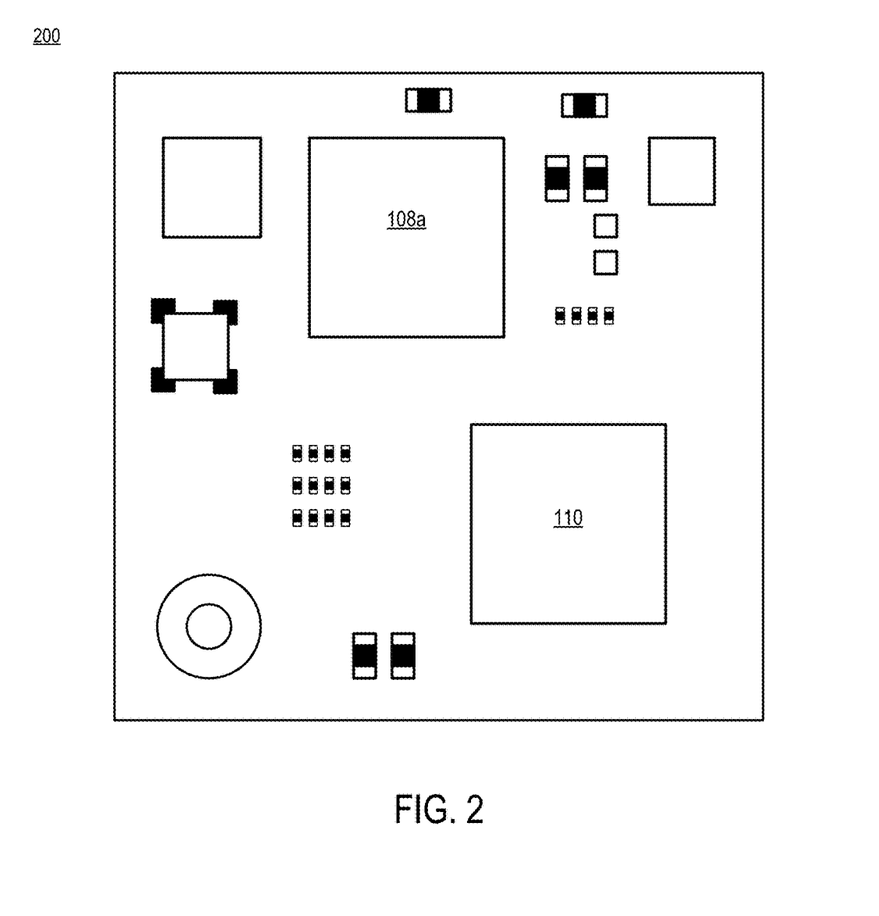
FIG. 2 illustrates an exemplary layout of a radio and advanced metering device.

FIG. 2 illustrates an exemplary layout of a radio and advanced metering device. FIG. 2 depicts example radio and metering device 200. Radio and metering device 200 includes a computing device 108a and transceiver 110. Radio and advanced metering device 200 can also include a front end module, memory, a clock, a regulator, and other components. The arrangement and layout depicted in FIG. 2 are one example of a multi-device module. Other arrangements and layouts are possible.

In one example, the radio and metering device 200 can use a multi-device-module or a multi-chip module (MCM) with a land grid array (LGA) package, which may be soldered directly to a circuit board of a host device. In this example, all components, e.g., computing device 108, transceiver 110, etc., are located on one side of a printed circuit board (PCB). The components are encapsulated and covered by a shield to prevent tampering. The MCM has pads, or attachment points, on the opposite side or underside of the PCB (not shown). The radio and advanced metering device 200 can use other types of packaging such as system-in-package (SiP), chip-scale packaging (CSP), stacked integrated circuits, three-dimensional integrated circuits, a PCB connected via a connector on the host device, etc.

To minimize the size of the device, the radio and metering device may be designed to minimize the number of components, to use small components, and/or to optimize the layout of the components. For example, radio and advanced metering device 200 can use a single integrated circuit that contains both the radio transceiver and a microcontroller with additional built-in functions such as memory, etc. In one exemplary implementation, the radio and advanced metering device has dimensions of 22 mm×23 mm.

Figure 3:
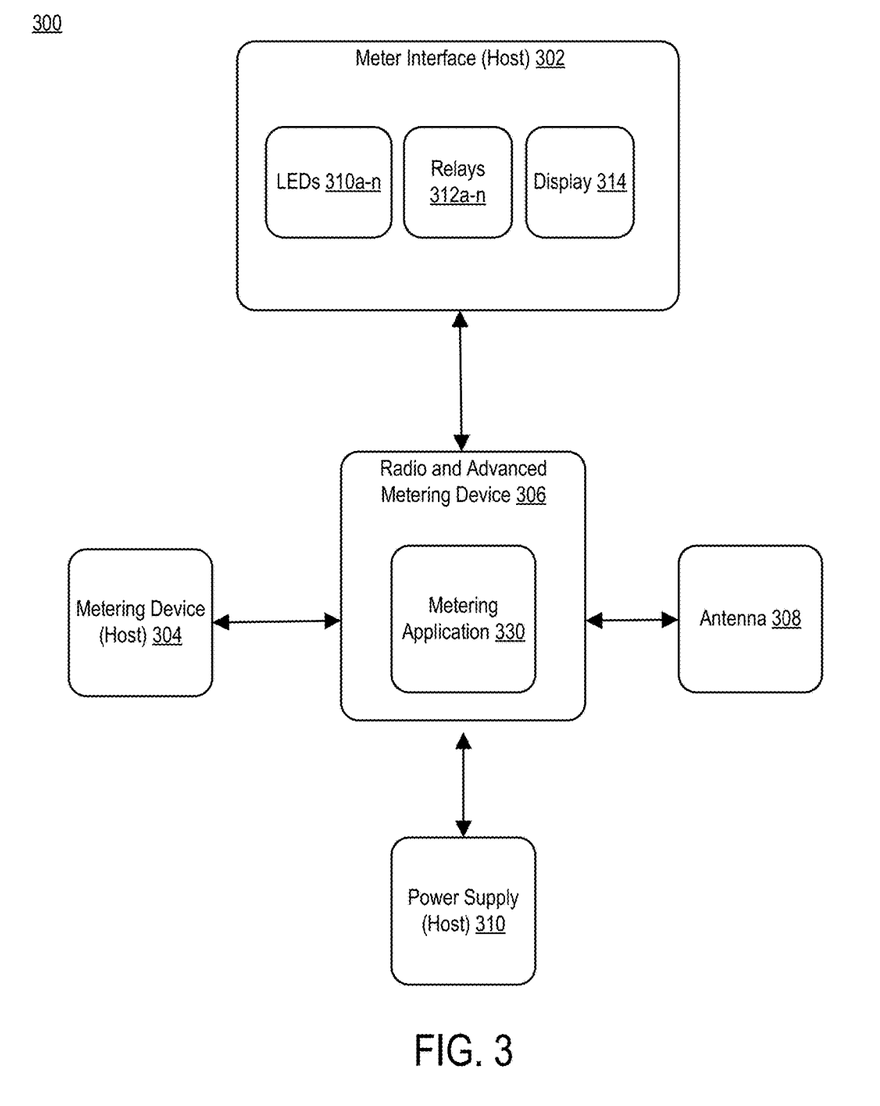
FIG. 3 illustrates an exemplary block diagram of a host device with a radio and advanced metering device.

FIG. 3 illustrates an exemplary block diagram of a metering system 300 that includes a host device and a radio and advanced metering device. The host device includes radio and advanced metering device 306, metering device 304, meter interface 302, antenna 308, and power supply 310. Radio and advanced metering device 306 is a device that can perform radio communications and advanced metering functions, such as radio and advanced metering device 100 depicted in FIG. 1 or radio and advanced metering device 200 depicted in FIG. 2.

In an example, radio and advanced metering device 306 connects via a host device interface such as host device interface 102, to devices or components, such as metering device 304, antenna 308, and power supply 310. Radio and advanced metering device 306 includes metering application 330. As described further herein, metering application 330 can perform various advanced functions, including advanced metering functions and network communications.

Metering device 304 can measure the consumption of water, gas, electricity, etc. When the metering device measures the consumption of electricity, the metering device 304 may measure current and/or voltage and may perform some limited analysis or calculations. Metering device 304 may send basic metering data, such as instantaneous or accumulated electrical quantities, such as KWh, VI, VA, etc. to the radio and advanced metering device 306.

Radio and advanced metering device 306 can receive metering data from metering device 304 and use the data to perform additional analysis or calculations. Advanced metering functions provided by radio and advanced metering device 306 can include, but are not limited to: applications such as determining interval data, tariffication, event logging, load control, and QoS (quality of service). QoS analysis can include the analysis of data such as voltage, frequency, waveform, phase, or continuity of service. Radio and advanced metering device 306 can provide QoS analysis to meter interface 302. Radio and advanced metering device 306 may communicate the data or other information to other devices via the radio and antenna 308.

Once connected to metering device 304 and powered up, radio and advanced metering device 306 can automatically connect to a wireless network. The advanced metering functions may be pre-configured and may be adjusted over the radio link as needed.

Meter interface 302 is an interface used to display information. For example, meter interface 302 can display consumption, rate, and status information to a user, e.g., an end customer. Meter interface 302 can display information using light emitting diodes (LEDs) 310a-n, each of which can indicate a status. For example, one of the LEDs 310a-n can indicate whether the meter is working properly or whether the meter is communicating with an external device such as a network. Meter interface 302 can also include display 314. Display 314 can be a display such as a liquid crystal display (LCD), LED display, or any other kind of display. Display 314 can indicate a status of metering device 304 such as whether a resource is being consumed, or a status of radio and advanced metering device 306 such as whether radio and advanced metering device 306 is functional or communicating with the network.

Meter interface 302 can include one or more relays 312a-n. Relays 312a-n can control external devices. For example, relays 312a-n can control signals that enable the connection of a resource to a premises such as a 120 Volt or 240 Volt supply.

Radio and advanced metering device 306 can communicate information to meter interface 302, so that the information may correspond to the analysis and functions performed by the radio and advanced metering device 306.

Power supply 310 can provide power to the components of the host device, as well as to radio and advanced metering device 306. In an aspect, power supply 310 is omitted from the radio and advanced metering device 306. Antenna 308 may be used by the radio and advanced metering device for wireless communication. Antenna 308 may be integrated on the host device PCB or may be an external antenna. In an aspect, antenna 308 is omitted from the radio and advanced metering device 306.

The radio and advanced metering device 306 can execute one or more metering applications 330. In an aspect, metering application 330 can also implement a software-defined radio. Software-defined radio components can include at least some of the communication functionality described with respect to transceiver 110. Software-defined radio functions can include filtering, mixing, amplification, or other functions.

Figure 4:
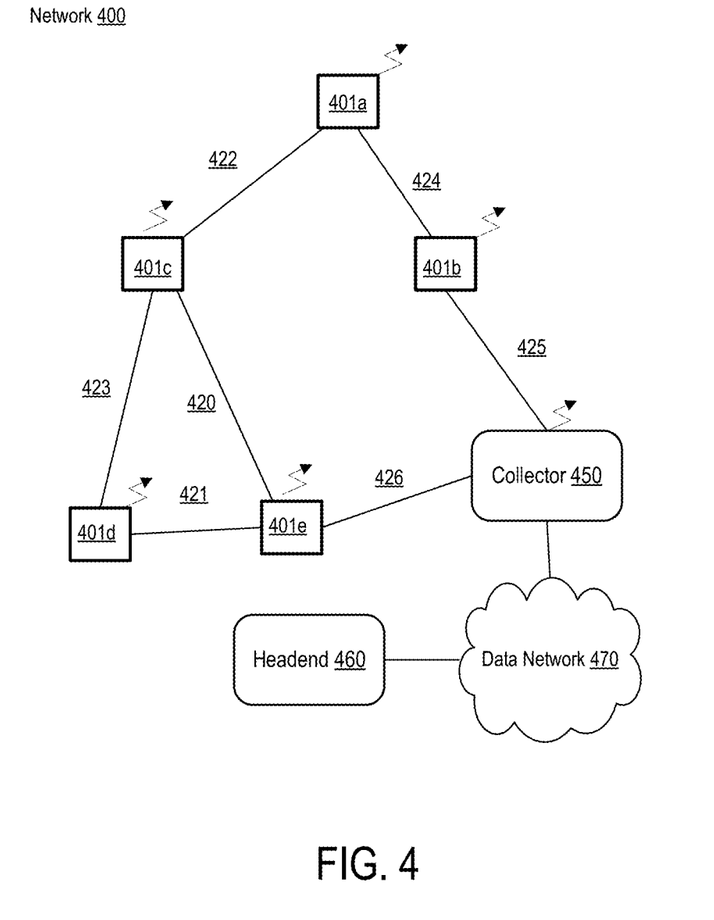
FIG. 4 illustrates an exemplary network of radio and advanced metering devices.

FIG. 4 illustrates an exemplary network 400 of radio and advanced metering devices. The network 400 includes radio and advanced metering devices 401a-e and collector 450. The collector connects the network to a headend system 460 via data network 470. Each radio and advanced metering device 401a-e can be a host device with a radio and advanced metering device. Alternatively one or more of the devices may be a different type of metering device. Additional or alternative devices may also be connected to the network. Metering devices 401a-e can be located within a customer's premises such as a home or business.

Connections 420-426 depict wireless communications links. For example, as shown, radio and advanced metering devices 401a and 401b are connected by communication link 424, 401a and 401c by communications link 422, devices 401c and 401d by communication link 423, devices 401a and 401e by communication link 420, devices 401a and 401c by communication link 422, and devices 401d and 401e by communication link 421. The network may be a wireless mesh network so the wireless communications links may change.

Data network 470 connects collector 450 and headend system 460. Data network 470 can be any kind of data network, for example, wired or wireless. Advanced metering devices 401a-e can measure, log, and transmit data such as voltage, power, phase, or energy consumption over a period of time to collector 450.

The following provides examples of some advanced functions provided by the radio and advanced metering device.

Interval Data

Figure 5:
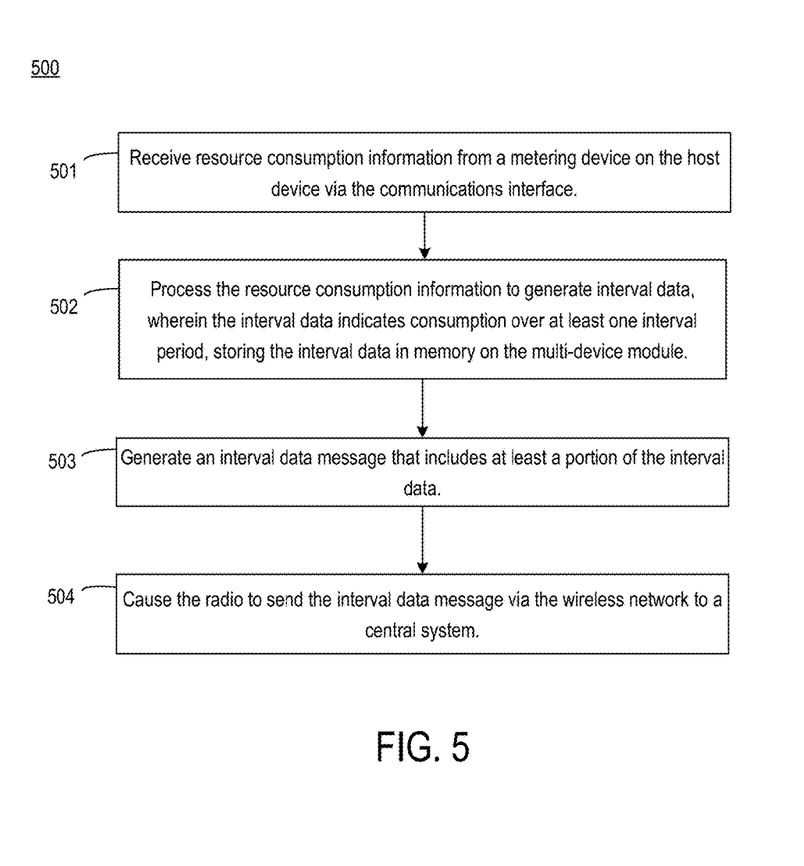
FIG. 5 is a flowchart illustrating an exemplary process for resource measurement using the advanced metering device.

FIG. 5 is a flowchart illustrating an exemplary process for an interval data metering function. At block 501, method 500 involves receiving resource consumption information from a metering device on the host device via the communications portion of the host device interface. For example, metering device 304 provides resource consumption data to the radio and advanced metering device 306. Resource consumption data includes voltage, current, power, phase, or energy consumption data.

At block 502, method 500 involves processing the resource consumption information to generate interval data, wherein the interval data indicates consumption over at least one interval period, and storing the interval data in memory. For example, the radio and advanced metering device can determine power from voltage and current, or energy consumption over time from power and time.

At block 503, method 500 involves generating an interval data message that includes at least a portion of the interval data. The interval data message may include a device identifier, or account number, and the amount of resource such as electricity consumed over one or more intervals. At block 504, method 500 involves causing the radio to send the interval data message via the wireless network to a central system, such as a headend system. Metering application 330 causes transceiver 110 to send the message via the RF port 104 and antenna to a wireless network. The application generates and/or transmits the interval data message to meet the timing requirements of the headend system for interval data messages. A headend system connected to the wireless network receives the message and handles the message appropriately, such as by generating a bill for a user. The radio and advanced metering application also responds to any communications from the headend system regarding missing interval data.

Event Logging

In another example, metering application 330 provides event logging. For example, an event may be generated by the host device or by the radio and advanced metering device. Events can include momentary or sustained power outages. Either the host device or the radio and advanced metering device can detect such an event. The radio and advanced metering device may log information about the event in its memory. It may also generate an event message, which includes information or fields required by the headend system, and send the message to the headend according to any timing requirements of the headend system. In an aspect, the headend system maintains a list of events and associated details.

Load Control

Metering application 330 can also control devices external to the host device, such as air conditioners, heaters, or fans. In this aspect, metering application 330 can control power to the device or settings of the device.

User Interface

Metering application 330 may allow user configuration of certain functions, such as load management, by enabling a user to interact through a remote website or portal with the metering application 330. For example, a user may log on to a portal and configure metering application 330 to turn off or adjust the settings of an appliance such as an air conditioner to meet certain consumption goals or otherwise configure metering application 330.

The radio and advanced metering device 306, using metering application 330, can provide real-time energy usage information to a user via meter interface 302. Metering application 330 can store historical data, such as past energy consumption, in a memory of computing device 108a-n, and provide such data to a user for comparison purposes. Additionally, because metering application 330 can connect to a headend system, e.g., via transceiver 110 connecting to a wireless network, metering application 330 can determine applicable utility rates, e.g., kilowatt/hour, and provide accurate cost information to a user. Metering application 330 can also determine an average environmental impact. An environmental impact can be a calculation of the resource use of a change, such as turning on the air conditioner more often. An environmental impact can also be a measurement of the carbon dioxide used by burning a portion of fuel in order to generate the electricity used by a user over a period of time.

Firmware Updates

In an aspect, metering application 330 can receive firmware updates from a headend system. The updates can include security updates or functional updates. The updates may update existing functions or enable the radio and advanced metering device to provide additional functions.

Other Advanced Functions

Additional and alternative functions are also possible. In an aspect, the radio and advanced metering device 306 may receive an indication of a rotation of a dial wheel in a meter, such as a pulsed signal, over the host device interface 102 from the metering device 304. Metering application 330 may process the pulsed signal to determine consumption or for other purposes.

Metering application 330 can also support local generation functions. For example, if power generators such as solar panels or a wind turbine, are installed at a premises, then metering application 330 can determine whether power is flowing back into an electric grid and provide information such as energy saved or revenue generated to a user.

Figure 6:
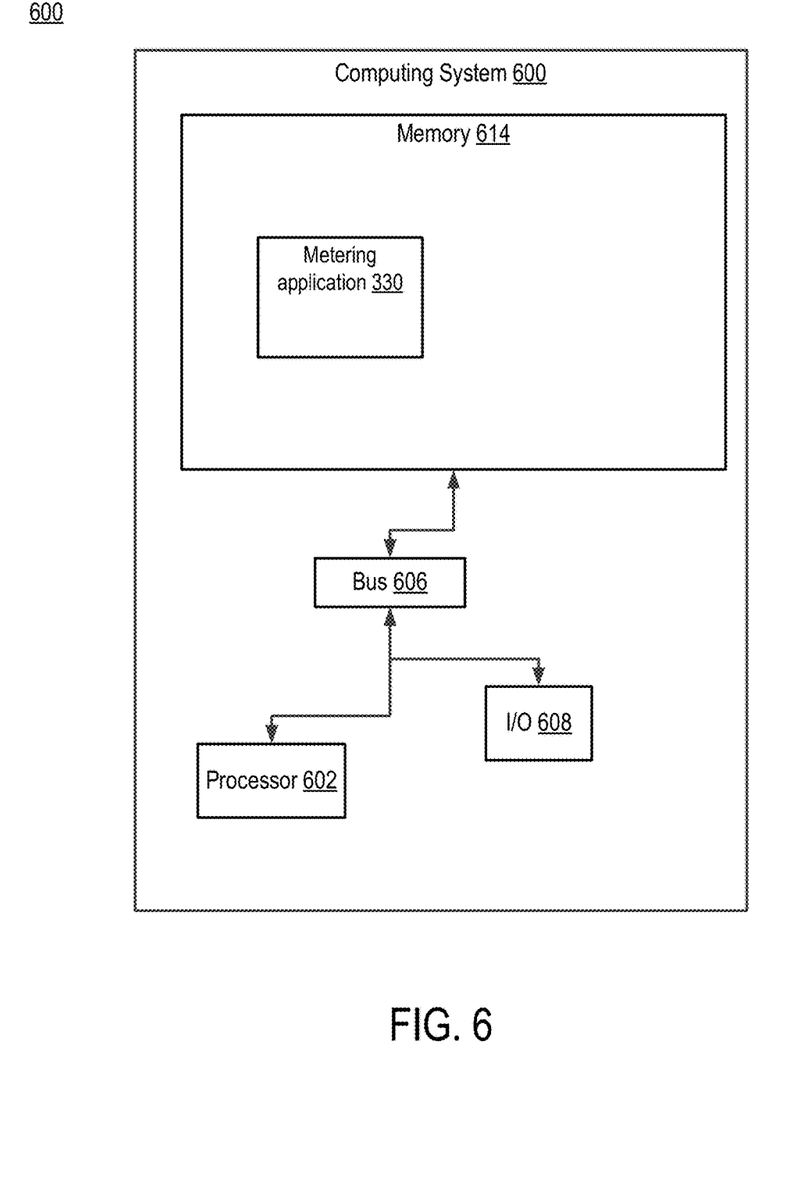
FIG. 6 is a block diagram depicting an example computing system for performing functions of the advanced metering system.

FIG. 6 is a block diagram depicting an example computing system for performing functions of the advanced metering system, according to some aspects of the current disclosure. Some or all of the components of the computing system 600 can belong to one or more of the computing devices 108a-n of FIG. 1. For example, the metering application 330 may operate on the computing system 600. The computing system 600 includes one or more processors 602 communicatively coupled to one or more memory devices 614. The computing system 600 executes program code that configures the processor 602 to perform one or more of the operations described above with respect to FIGS. 1-5. The program code of the metering application 330, which can be in the form of non-transitory computer-executable instructions, can be resident in the memory device 614 or any suitable computer-readable medium and can be executed by the processor 602. Execution of such program code configures or causes the processor(s) to perform the operations described herein with respect to the computing devices 108a-n.

The computing system 600 may also include an input/output ("I/O") interface 608 that can receive input from input devices or provide output to output devices. Interface 608 may include interface 121. The computing system 600 may be able to communicate with one or more other computing devices or computer-readable data sources using the interface 608.

A bus 606 can also be included in the computing system 600. The bus 606 can communicatively couple one or more components of the computing system 600 and allow for communication between such components.

While the present subject matter has been described in detail with respect to specific aspects thereof, it will be appreciated that those skilled in the art, upon attaining an understanding of the foregoing, may readily produce alterations to, variations of, and equivalents to such aspects. For example, the host device is not limited to an electricity meter. Other types of host devices are possible and include thermostats, load switches, household appliances, etc. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A multi-device module comprising:
   a host device interface within the multi-device module, the host device interface configured to connect the multi-device module to a host meter device, wherein the host device interface includes:
   a communications interface configured to send communications to and receive communications from the host meter device;
   a power interface configured to receive power from the host meter device; and
   an antenna interface configured to connect a radio on the multi-device module with an antenna on the host meter device,
   the radio configured to transmit radio frequency signals to a wireless network via the antenna interface and to receive radio frequency signals from the wireless network via the antenna interface; and
   a computing device within the multi-device module and communicatively coupled to the communications interface and to the radio, wherein the computing device is configured to provide interval data functions by:
   receiving resource consumption information from a metering device on the host meter device via the communications interface,
   processing the resource consumption information to generate interval data, wherein the interval data indicates consumption over at least one interval period,
   storing the interval data in memory on the multi-device module,
   generating an interval data message that includes at least a portion of the interval data, and
   causing the radio to send the interval data message via the antenna interface and the wireless network to a central system, wherein the computing device is configured to facilitate remote control of the host meter device by:
   receiving, via the wireless network and the radio, a command from the central system,
   processing the command to determine a control message for the metering device, wherein the control message provides instructions for controlling the metering device; and sending the control message to the host meter device via the communications interface to control the metering device, wherein:
the host device interface is disposed on a first side of a printed circuit board, the first side comprising a plurality of contacts that connect to the host device interface, and
the computing device and the radio are disposed on a second side of the printed circuit board, wherein the second side comprises a shield that covers the computing device and the radio.

2. The multi-device module of claim 1, further comprising a power supply configured to:
receive power from the host meter device via the power interface;
generating a regulated voltage from the power; and
provide the regulated voltage to the computing device and the radio.

3. The multi-device module of claim 1, wherein the computing device is further configured to provide event logging functions by:
receiving an indication of an event detected by the host meter device from the communications interface, wherein the event identifies one or more of: (i) a power outage or (ii) an identification of a consumption level that is over a threshold;
processing the indication of the event;
storing information about the event in memory on the multi-device module;
generating an event message; and
causing the radio to send the event message via the wireless network to the central system.

4. The multi-device module of claim 1, wherein the computing device is further configured to:
receive a command from a remote device via the wireless network and the radio;
process the command to determine a response to the command; and
when the command requires use of the interval data stored in memory on the multi-device module, access the memory and generate the response to the command using the interval data.

5. The multi-device module of claim 1, wherein causing the radio to send the interval data message comprises sending the interval data message according to timing information stored on the multi-device module.

6. A multi-device module comprising:
a host device interface within the multi-device module, the host device interface configured to connect the multi-device module to a host meter device, wherein the host device interface includes:
a communications interface configured to send communications to and receive communications from the host meter device;
a power interface configured to receive power from the host meter device; and
an antenna interface configured to connect a radio on the multi-device module with an antenna on the host meter device, wherein
the radio is configured to transmit radio frequency signals to a wireless network via the antenna interface and is configured to receive radio frequency signals from the wireless network via the antenna interface;

a first computing device within the multi-device module and communicatively coupled to the communications interface and to the radio, wherein the first computing device is configured to:
receive resource consumption information from a metering device on the host meter device via the communications interface, and
cause the radio to send an interval data message via the antenna interface and the wireless network to a central system;
receive, via the wireless network and the radio, a command from the central system,
process the command to determine a control message for the metering device, wherein the control message provides instructions for controlling the metering device; and
send the control message from the first computing device to the host meter device via the communications interface; and
a second computing device communicatively coupled to the first computing device and configured to:
receive resource information from the first computing device;
process the resource consumption information to generate interval data, wherein the interval data indicates consumption over at least one interval period,
store the interval data in memory on the multi-device module,
generate an interval data message that includes at least a portion of the interval data, and
send the interval data message to the first computing device, wherein:
the host device interface is disposed on a first side of a printed circuit board, the first side comprising a plurality of contacts that connect to the host device interface, and
the first computing device, the second computing device, and the radio are disposed on a second side of the printed circuit board, wherein the second side comprises a shield that covers the first computing device, the second computing device, and the radio.

7. The multi-device module of claim 6 wherein the first computing device is configured to execute a smart metering application that is configured to calculate one of (i) current energy use, (ii) historical energy use, or (iii) environmental impact.

8. The multi-device module of claim 6, wherein the first computing device is configured to perform one or more of: (i) filtering, (ii) mixing, or (iii) amplification of a signal that is either (i) received from the radio or (ii) sent to the radio.

9. The multi-device module of claim 6, wherein the communications interface is configured to connect to a power-line communications system, and wherein the first computing device is further configured to:
receive a command from the communications interface and the power-line communications system, and
send, via the communications interface, the command to the host meter device.

10. The multi-device module of claim 6, wherein the second computing device is configured to download an original metering application and install the original metering application.

11. The multi-device module of claim 6, wherein the multi-device module is packaged in a land grid array comprising a plurality of contacts and the host device interface connects to the plurality of contacts.

12. A multi-device module comprising:
a host device interface within the multi-device module, wherein the host device interface is configured to connect the multi-device module to a host meter device and wherein the host device interface includes:
  a communications interface configured to send communications to and receive communications from the host meter device;
  a power interface configured to receive power from the host meter device; and
  an antenna interface configured to connect a radio on the multi-device module with an antenna on the host meter device;
a radio configured to transmit radio frequency signals to a wireless network via the antenna interface and to receive radio frequency signals from the wireless network via the antenna interface; and
a computing device within the multi-device module and communicatively coupled to the communications interface and to the radio, wherein the computing device is configured to provide interval data functions by:
  receiving a pulse from a metering device on the host meter device via the communications interface, the pulse indicating resource consumption,
  calculating, a volume of resource consumption based on the pulse, and
  storing the volume of resource consumption in memory on the multi-device module,
  generating an data message that includes the resource consumption, and
  causing the radio to send the data message via the antenna interface and the wireless network to a central system; and wherein the computing device is configured to facilitate remote control of the host meter device by:
  receiving, via the wireless network and the radio, a command from the central system,
  processing the command to determine a control message for the metering device, wherein the control message provides instructions for controlling the metering device; and
  sending the control message to the host meter device via the communications interface to control the metering device, wherein:
the host device interface is disposed on a first side of a printed circuit board, the first side comprising a plurality of contacts that connect to the host device interface, and
the computing device and the radio are disposed on a second side of the printed circuit board, wherein the second side comprises a shield that covers the computing device and the radio.

13. The multi-device module of claim 1, further comprising a power supply, wherein the computing device, the radio, and the power supply are integrated as one integrated circuit disposed on the first side and wherein the shield covers the integrated circuit.

14. The multi-device module of claim 1, further comprising a display, wherein the computing device is configured to execute a smart metering application that is configured to:
  determine information comprising one or more of: (i) whether a resource is being consumed, (ii) a status of a communications link over the communications interface with the host meter device, and (iii) whether the host meter device is operational, and
  display the information on the display.

15. The multi-device module of claim 1, wherein the computing device is configured to execute a smart metering application that is configured to:
  calculate, based on the interval data, information comprising one of (i) current energy use, (ii) historical energy use, (iii) environmental impact, (iv) quality of service, (v) outage detection, (vi) load forecasting, or (vii) appliance fault detection; and
  transmit the information to an external device communicating with the radio.

16. The multi-device module of claim 1, wherein the computing device is further configured to perform one or more of: (i) encoding the interval data message, (ii) decoding the interval data message, (iii) encrypting the interval data message, and (iv) decrypting the interval data message.

17. The multi-device module of claim 12, wherein the computing device is configured to:
  calculate, based on the volume of resource consumption, information comprising one of (i) current energy use, (ii) historical energy use, (iii) environmental impact, (iv) quality of service, (v) outage detection, (vi) load forecasting, or (vii) appliance fault detection; and
  transmit the information to an external device communicating with the radio.

18. The multi-device module of claim 1, wherein the plurality of contacts are integrated into a land grid array.

19. The multi-device module of claim 1, wherein the computing device is configured to execute a smart metering application that is configured to calculate one of (i) current energy use, (ii) historical energy use, or (iii) environmental impact.

20. The multi-device module of claim 1, wherein the computing device is configured to perform one or more of: (i) filtering, (ii) mixing, or (iii) amplification of a signal that is either (i) received from the radio or (ii) sent to the radio.

* * * * *

UNITED STATES PATENT AND TRADEMARK OFFICE
CERTIFICATE OF CORRECTION

PATENT NO.        : 10,425,704 B2
APPLICATION NO.   : 16/035730
DATED             : September 24, 2019
INVENTOR(S)       : Keith Torpy et al.

Page 1 of 1

It is certified that error appears in the above-identified patent and that said Letters Patent is hereby corrected as shown below:

In the Claims

In Column 9, Line 16, in Claim 2, delete "generating" and insert -- generate --, therefor.

In Column 12, Line 15, in Claim 14, after "operational" delete "," and insert -- ; --, therefor.

Signed and Sealed this
Twenty-fourth Day of December, 2019

Andrei Iancu
*Director of the United States Patent and Trademark Office*